(12) United States Patent
Na et al.

(10) Patent No.: US 7,613,693 B1
(45) Date of Patent: Nov. 3, 2009

(54) PREFERENTIAL RANKING OF CODE SEARCH RESULTS

(75) Inventors: Piaw Na, Saratoga, CA (US); Phil Sung, Saratoga, CA (US)

(73) Assignee: Google Inc., Mountain View, CA (US)

( * ) Notice: Subject to any disclaimer, the term of this patent is extended or adjusted under 35 U.S.C. 154(b) by 203 days.

(21) Appl. No.: 11/565,081

(22) Filed: Nov. 30, 2006

(51) Int. Cl.
*G06F 7/00* (2006.01)

(52) U.S. Cl. .......................................... 707/3
(58) Field of Classification Search ............ 707/3
See application file for complete search history.

(56) References Cited

U.S. PATENT DOCUMENTS

| 2002/0091736 A1* | 7/2002 | Wall ........................... 707/513 |
| 2003/0110192 A1* | 6/2003 | Valente et al. .............. 707/513 |
| 2005/0216454 A1* | 9/2005 | Diab et al. .................... 707/3 |

OTHER PUBLICATIONS

Gtags, Google code, Sourceforge.net [online] [retrieved on May 27, 2009]. Retrieved from the Internet: http://goog-gtags.sourceforge.net/.

Ashcraft, Ken et al., "New Project Released into Open Source: GTAGS", [online] Jan. 20, 2006, Google Code Blog, Google Code, [retrieved on May 27, 2009]. Retrieved from the Internet: http://google-code-updates.blogspot.com/2006/01/new-project-released-into-open-source.html.

Cox, Russ, "Search the world's public source code", [online] Oct. 5, 2006, Google Code Blog, Google code, [retrieved on May 27, 2009]. Retrieved from the Internet: http://google-code-updates,blogspot.com/2006/10/search-worlds-public-source-code.html.

Cubrilovic, Nik, "Google Presents Code Search", [online] Oct. 5, 2006, TechCrunch, [retrieved on May 27,2009]. Retrieved from the Internet: http://www.techcrunch.com/2006/10/05/google-presents-code-search/.

* cited by examiner

*Primary Examiner*—Charles Rones
*Assistant Examiner*—Fazlul Quader
(74) *Attorney, Agent, or Firm*—Fish & Richardson P.C.

(57) ABSTRACT

TAG files are generated on a client and communicated to a server. The TAGS files are indexed and loaded into memory on the server. Search requests are run against the index and files that contain tags that satisfy the search request are ranked. The ranking is based on an include-tree of the file that contains the tag, the relative directory distance of the file containing the tag from the current context, or by using the numbers of levels of inclusion needed to reach a tag that satisfies the query. In some implementations, an extensible protocol is used to communicate the search queries and files that contain tags that satisfy the search query.

21 Claims, 5 Drawing Sheets

```
⊠                    : gtags.cc  psung-gtags2                    ▭ ▢ ✕
File   Edit    Options    Buffers   Tools   C++   P4   Help
    tags_request_handler = new TagsRequestHandler (FLAGS_tags_file,
                                                   FLAGS_fileindex,
                                                   FLAGS_gunzip) ;
    ▎electServer ss ;
    AcceptingConnection<TagsConnection> listener (&ss, FLAGS_tags_port) ;
    HTTPServer server (&ss, FLAGS_http_port, "Gtags diagnostics server") ;
    ss . Loop() ;
--:%%       gtags.cc       93% (163,2)      [ [ [ [ (C++/1 P4:35 Abbrev) ] ] ] ]---------
▎./caribou/caribou_uploader. cc : 73 :  SelectServer* ss = new SelectServer() ;
. /caribou/errordisplay. cc : 1630 :  SelectServer* ss = new SelectServer() ;
. /chartserver/chartserver_test. cc : 37 : :  ss_ (new SelectServer() ) ,
. /chubby/lockserver. cc : 332 :  SelectServer *ss = new SelectServer() ;
. /chubby/lswatcher. cc : 159 :  ss = new SelectServer() ;
. /common_install/cominst. cc : 1898 :  SelectServer* ss = new SelectServer() ;
. /compute/dcstatsclient. cc : 71 :  SelectServer* ss_ = newSelectServer() ;
. /gws/header_unittest. cc : 1304 :  dummy_ss_ = new SelectServer() ;
. /gws/kansas_handler_unittest. cc :440 :  dummy_ss_ = new SelectServer() ;
-u:%*    *CALLERS: SelectServer*    1% (2,0)    [ [ [ [ (GTAGS) ] ] ] ]------------
```

FIG. 4

```
⊠                    : gtags.cc  psung-gtags2                    ▭ ▢ ✕
File   Edit    Options    Buffers   Tools   C++   P4   Help
    tags_request_handler = new TagsRequestHandler (FLAGS_tags_file,
                                                   FLAGS_fileindex,
                                                   FLAGS_gunzip) ;
    SelectServer ss ;

AcceptingConnection<TagsConnection> listener (&ss, FLAGS_tags_port) ;
    HTTPServer server (&ss, FLAGS_http_port, "Gtags diagnostics server") ;
--:%%       gtags.cc       93% (166,29)     [ [ [ [ (C++/1 P4:35 Abbrev) ] ] ] ]---------
▎ools/tags/gtags. cc : 70 :  bool HandleRead () {
tools/tags/gtags. cc : 134 :  void SetManager (ServerConnectionManager *manager) { }
tools/tags/gtags. cc : 68 :  class TagsConnection : public BufferedConnection {
tools/tags/gtags. cc : 138 :  int TimeBetweenClocks (clock_t end, clock_t start) {
tools/tags/gtags. cc : 62 :  LogRecordWriter* Logger ;
tools/tags/gtags. cc : 145 :  int main (int argc, char **argv) {
tools/tags/gtags. cc : 65 :  TagsRequestHandler* tags_request_handler ;

-u:%*    *TAGS: gtags.cc*    All (1,0)    [ [ [ [ (GTAGS) ] ] ] ]------------
Mark set
```

FIG. 5

PREFERENTIAL RANKING OF CODE SEARCH RESULTS

TECHNICAL FIELD

This disclosure relates to indexing, ranking and retrieval of information.

BACKGROUND

Text editor applications, such as Emacs, are used by developers to write source code. Emacs include a "Tags" indexing function that is used to map symbols (e.g., function names, global variables, typedefs, defines) to their definitions within source code files where they are defined. The mappings are listed in a TAGS file where each entry in the TAG file includes the name of a tag (i.e., a symbol), the name of the file where the tag is defined, and the position in the file that where the definition of the tag is located.

Users search for definitions of tags by entering a command to search the TAGS file. When a match is located in the TAGS file, the tag definition information is used to determine the file where the definition of the tag is provided and the approximate character position of the definition in the file. A cursor is moved to the approximate character position, and the file is searched for the tag definition.

Where there is a large code base, potentially multiple results can be returned for a given search. Developers must sift through the results to select the appropriate file location for a tag definition. As the code base grows, an increasingly larger number of results are returned.

SUMMARY

According to some implementations, a method includes building an index of tags where the index includes a name of a file in which each tag is defined, a path to the file relative to a root directory, and a representation of an include-tree of the file. A search query and a current context is received and a search the index for results that satisfy the search query is performed. The results are ranked in accordance with the current context and the include-tree of each result, and are communicated to a requesteor.

According to some implementations, a method includes creating an s-expression TAGS file containing for each source file a name of the source file, a path of the source file relative to a root directory, a language of the source file, a location of a tag within the file, and an item descriptor of the tag. Search queries are communicated using an s-expression protocol, where the search queries including a target tag and a current context. Query results are received as an s-expression list, the s-expression list including at least one result that matches the search query, a snippet of the line that matches the search query, a path to a file that matches the search query, a line number of the result, an offset into the file where the result is located, or a directory distance between the matching file and the current context.

These and other example implementations can include one or more of the following features or advantages. In some implementations, ranking of the query results in accordance with the current context aids in narrowing the results and providing more relevant information in response to the search query.

The details of one or more implementations are set forth in the accompanying drawings and the description below.

DESCRIPTION OF DRAWINGS

FIGS. 3-5 illustrate exemplary user interfaces in which an application is presented.

Like reference symbols in the various drawings indicate like elements.

DETAILED DESCRIPTION

Figure 1:
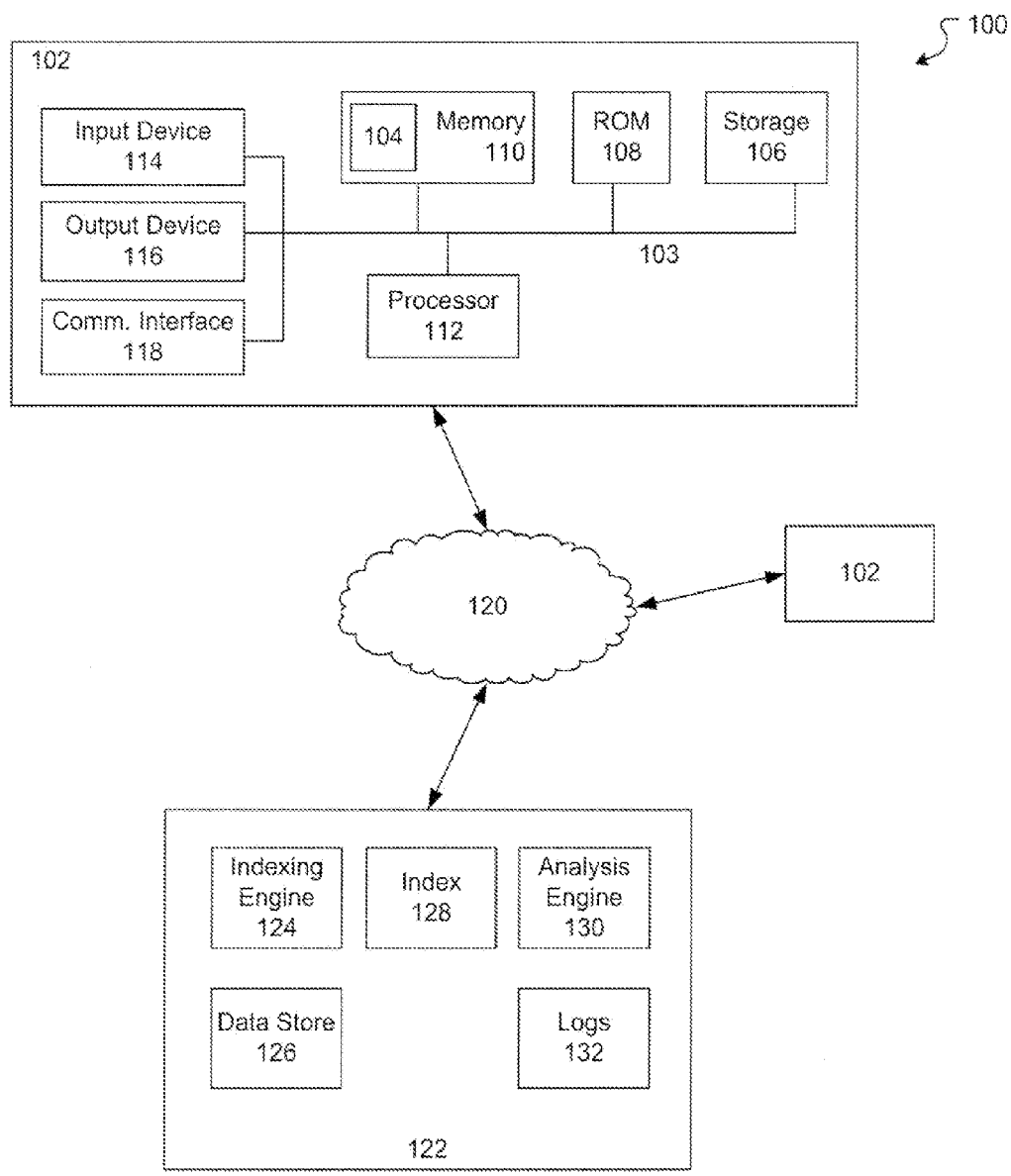
FIG. 1 illustrates an exemplary networked system.

FIG. 1 illustrates an exemplary networked system 100 in which systems and methods described herein may be implemented. The networked system 100 may include client devices 102 in communication with a server 122 over a network 120. The network 120 may be a local area network (LAN), a wide area network (WAN), a telephone network, such as the Public Switched Telephone Network (PSTN), an intranet, the Internet, or any suitable combination of networks. For purposes of clarity, two client devices 102 and one server 122 are illustrated as connected to the network 120. However, any suitable number of client devices 102 and servers 122 may be connected via the network 120. in addition, the client device 102 may perform the functions of the server 122 and the server 122 may perform the functions of the client device 122. The client devices 102 may include devices, such mainframes, microcomputers, personal computers, laptops, personal digital assistants, or the like, capable of connecting to the network 120. The client devices 102 may transmit data over the network 122 and/or receive data from the network 120 using a wired (e.g., copper, optical, etc.) and/or wireless connection.

The client device 102 may a data processing device, such as a personal computer having include a bus 103, a processor 112, a main memory 110, a read only memory (ROM) 108, a storage device 106, an input device 114, an output device 116, and a communication interface 118. The bus may include one or more conventional buses that permit communication among the components of the client device. The processor 112 may include any type of conventional processor or microprocessor that interprets and executes instructions. The main memory 110 may include a random access memory (RAM) or another type of dynamic storage device that stores information and instructions for execution by the processor. The ROM 108 may include a conventional ROM device or another type of static storage device that stores static information and instructions for use by the processor. The storage device 106 may include a magnetic and/or optical recording medium, for example, and its corresponding drive.

The input device 114 may include one or more conventional mechanisms that permit a user to input information to the client device such as a keyboard, a mouse, a pen, voice recognition and/or biometric mechanisms, etc. The output device 116 may include one or more conventional mechanisms that output information to the user, including a display, a printer, a speaker, etc. The communication interface 118 may include any transceiver-like mechanism that enables the client device to communicate with other devices and/or systems. For example, the communication interface may include mechanisms for communicating with another device or system over a network, such as network 120.

Users edit source code and input search queries using an application 104, such as an editor (e.g., EMACS, Python® client, or vim ("Vi Improved")). The client devices 102 perform these operations in response to the processor 112 executing software instructions contained in a computer-readable medium, such as the memory 110.

The server 122 may include one or more types of computer systems, such as a mainframe, minicomputer, or personal computer capable of connecting to the network 120 to enable the server 122 to communicate with the client devices 102. In alternative implementations, the server 122 may connect to one or more client devices 102, or the server 122 and client device 102 may be the same physical device. The server 122 may include more than one server 122 clustered to provide high availability and lower latency. The server 122 may transmit data over the network 120 or receive data from the network 102 through and interface using a wired or wireless connection.

The server 122 provides a narrowed, ranked view of TAGS file information in response to search queries for tag definitions. The server 122 includes an indexing engine 124 that indexes tag information contained in a data store 126 to create an index 128 of the tags their associated references, it also includes a TAGS server, which serves as the actual search engine receiving the requests and performing the ranking. An analysis engine 130 analyzes log files 132 to provide information regarding types of client applications 104 that call the server 122 and program languages against which the searches queries are performed.

Figure 2:
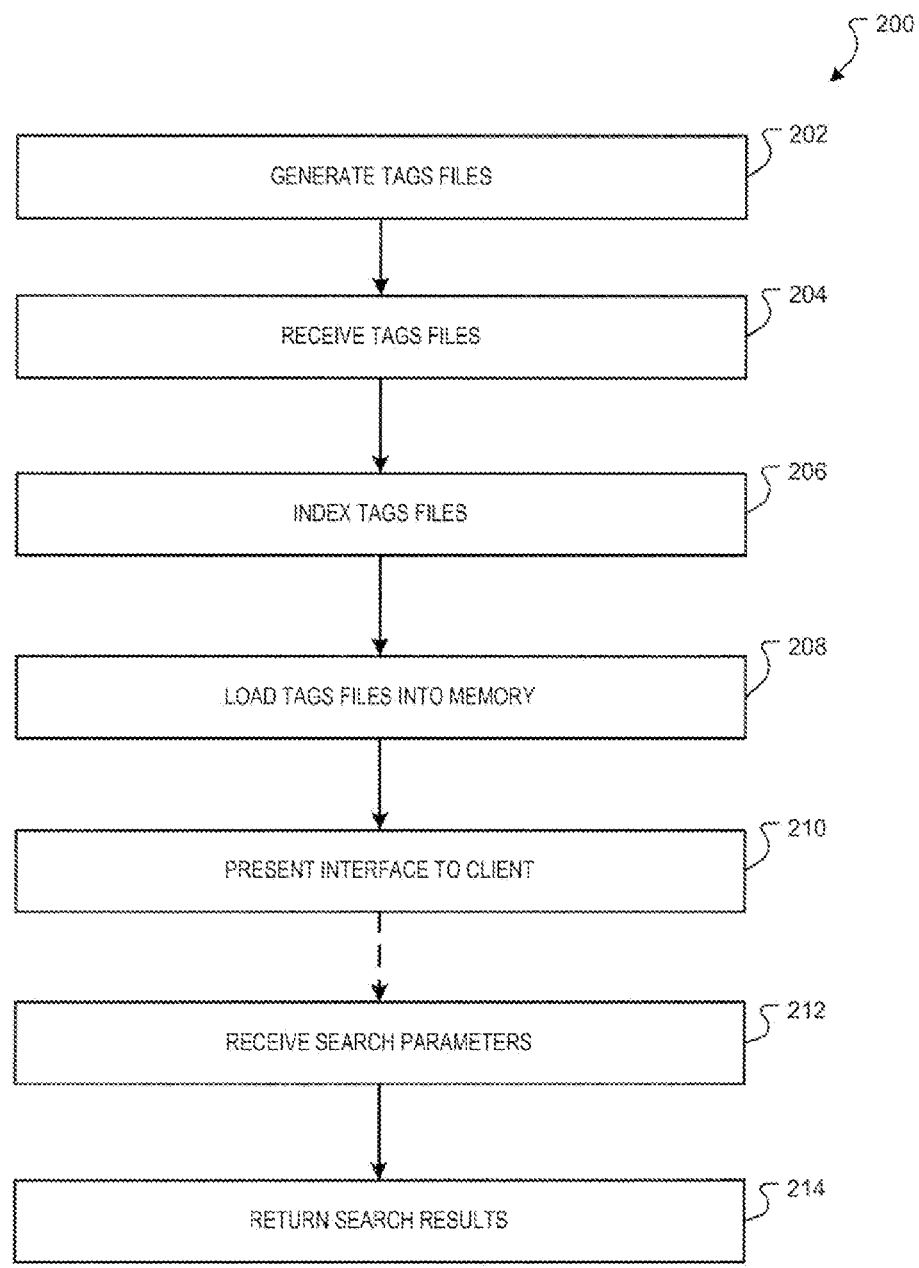
FIG. 2 is a flow chart of an exemplary process performed according to some implementations.

FIG. 2 is a flow chart of exemplary processes performed in accordance with some implementations. A user generates a TAGS file by entering a command within the application 104 (step 202). In some implementations, this TAGS file is generated automatically at some fixed interval (e.g., daily) by the server, provided the server has access to the source code. In accordance with some implementations, the TAGS file has an s-expression format (i.e, semi-structured data) or XML format (or other structured representation of data). The TAGS file begins with a header that identifies information about the TAGS file, such as a version number, and repository/directory. Following the header, the TAGS file contains entries for each source file and tags therein having a format such as:

(file (path "tools/tags/gtags.cc")
(language {"C++"|"Java"|"Python"})
(contents (item (line lineno)
  [(offset charno)]
  (descriptor item-descriptor)
  ... ))

The "path" value is a string with the path to the file relative to the base of the repository. The "language" value indicates the programming language of the file. Each element in the "contents" list represents an item of interest, where "lineno" indicates the line number where it appears, "offset" provides the character offset from the beginning of the file to the beginning of the line, and "item-descriptor" indicates an item descriptor. Optionally, snippet is the text of that line.

The item-descriptor indicates one of an included file, a definition of a type, a definition of a function, or a definition of a variable. Each item-descriptor is a list where a first element describes the type of item and subsequent elements are attribute/vale pairs. According to some implementations, a unique identifier (e.g., an arbitrary string) is assigned to each distinct item-descriptor.

After the TAGS file is generated, the TAGS file is transmitted to the server 122, where the TAGS files is loaded into the data store 126 (step 204). Multiple TAGS files can be loaded into the data store 126. According to some implementations, the server 122 converts etags-style TAGS files (i.e., older versions of TAGS files) to the above format, if necessary.

After the server 122 receives the TAGS file(s), the indexing engine 124 builds a index 128 of the TAGS files contained in the data store 126 (step 206). The index 128 incorporates the name of the file where each tag is defined, a path to the file relative to a root directory, and for each file, a representation of the include-tree of the file (i.e., the sequence of files that are included by this file or imported by the file). The index 128 is loaded into memory (step 208) and the server 122 presents an interface to the client application 104 (step 210).

According to some implementations, the client 102 and server 122 communicate using an s-expression., extensible protocol. At step 212, the server 122 receives a communication from the client 102 as an s-expression of this form:
 (command (attribute value . . . ) . . . )

where the command specifies an action, such as searching, pinging the server to determine latency, reloading TAGS files, writing to the server log, and determining a server version number. Each attribute specifies options, such as client type, client version and protocol version, to send to the server 122. One attribute is the current context (i.e., the file being edited) of the application 104. Attributes can be associated with one or more values.

According to some implementations, the client 102 and server 122 communicate using XML data, where the server 122 receives the XML data at step 212. Tags within the XML data define the commands, attributes and values.

According to some implementations, the client 102 opens a new connection to the server 122 by specifying a server name/location and a corresponding port number to that specified on the server 122. In some implementations, the client 102 and server 122 may be run on the same physical device.

If the server 122 receives a search command, one of the attributes associated with the search command is a tag name to be searched. A narrowed view of the results that satisfy the search are constructed from the index 128. The results are files that contain the tag name to be searched. According to some implementations, if the number of results is greater than one, the server 122 ranks the results according to whether the results appear in files within the include tree of the current context. Results that are within the include tree of the current context are ranked higher than the results that are not within the include tree of the current context.

According to some implementations, the server ranks the symbols that appear within the files in the include-tree by the relative directory distance from the current file/context to the returned result. The directory distance is determined by considering the directory structure as a tree and measuring the tree traversal distance between the directory of the current context and a resulting file. In some implementations, a further level of sorting is applied by using the levels of inclusion (how many times a file is included by other files in a recursive way) needed to reach the symbol, with lower levels of inclusion being ranked higher in the search results than higher levels of inclusion.

The server 122 returns results that satisfy the search query in an s-expression (step 212) having the form:
 ((server-start-time (start-time-high start-time-low))
 (sequence-number seq-num)
 (value return-value))

where start-time-high and start-time-low are optional integers representing the high- and low-order 16 bits of the server start time, and seq-num is an optional integer value selected by the server 122 that identifies the current request.

The return-value is a list of matches of this form:

```
(((tag tag)
  (snippet snippet)
  (filename filename)
  (lineno line-number)
  (offset file-offset)
  [(directory-distance dist)])
  ...)
``` where "tag" contains a corresponding tag that satisfies the search query, "snippet" is the line containing the corresponding tag, "filename" is the path to the matching file where the corresponding tag definition is located, "line-number" is the line number of the corresponding tag, and "file-offset" is the byte offset of the beginning of the corresponding tag (relative to the beginning of the file). Optionally, "dist" is the distance in the directory tree between the matching file and the current-file.

According to some implementations, searches can be limited to tags associated with a particular programming language attribute (e.g., C++, java, python, or szl) in accordance with an attribute communicated by the application 104.

Figure 3:
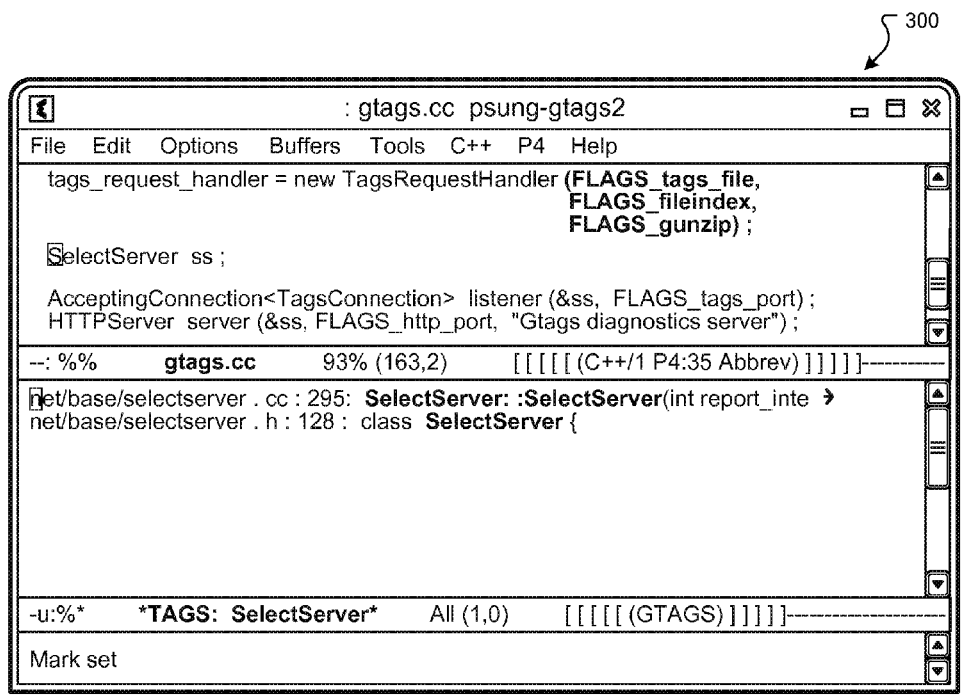

FIGS. 3-5 illustrate exemplary user interfaces in which an application is presented. Exemplary commands are input into the application 104 to select a server, search, view and sort definitions. FIG. 3 illustrates a user interface 300 in which the application 104 (e.g., Emacs) receives a command to select a server 122. FIG. 4 illustrates the user interface 300 in which the application 104 receives a command to show callers of a tag. The results are provided within the application window. FIG. 5 illustrates the user interface 300 in which the application 104 receives a show tag locations command and the name of an identifier or regular expression.

According to some implementations, if a single location is returned, the client application 104 shows the location. If multiple locations are returned, a new window is launched showing the tag, a path to the file where the tag is located, and a portion of the definition of the tag. If the user clicks on an item shown in the new window, the definition is shown in the client application 104.

Figure 6:
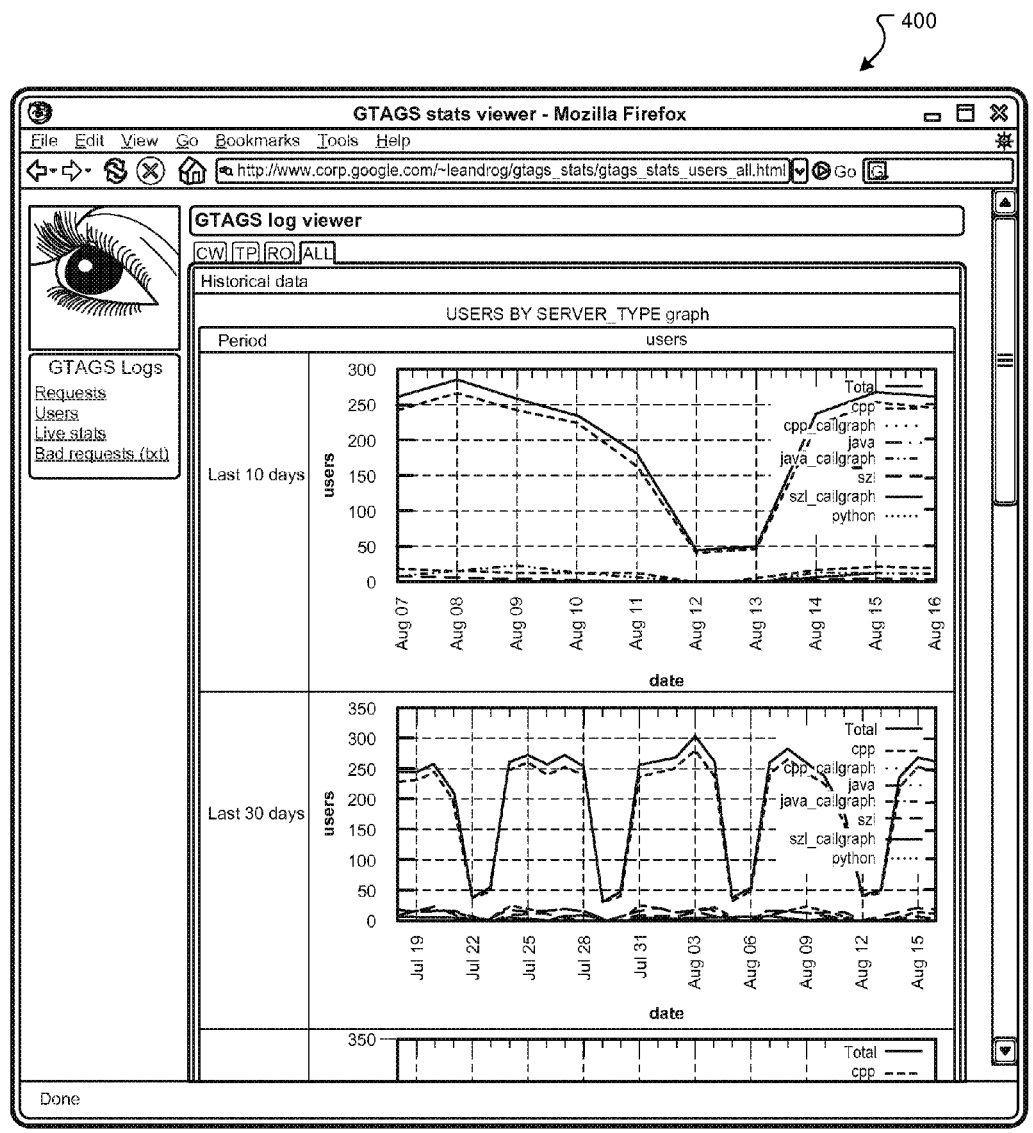
FIG. 6 illustrates an exemplary user interface showing an analysis of calling applications.

FIG. 6 illustrates an exemplary user interface showing an analysis of calling applications. Exemplary results 400 of the analysis engine 130 are shown illustrating a number of users and the languages against which queries were requested to be run on the server 122. The analysis engine 400 retrieves information from the logs 132 to generate the graph show in the results 400.

The implementations and all of the functional operations described in this specification can be implemented in digital electronic circuitry, or in computer software, firmware, or hardware, including the structures disclosed in this specification and their structural equivalents, or in combinations of one or more of them. Implementations can be realized as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations can be realized on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations can be put into practice in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains may specifics, these should not be construed as limitations on the scope of the invention or of what may be claimed, but rather as descriptions of features specific to particular implementations. Certain features that are described in this specification in the context of separate embodiments can also be implemented in a combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations have been described. Other embodiments are within the scope of the following claims. For example, the actions recited in the claims can be performed in a different order and still achieve desirable results.

The invention claimed is:

1. A computer-implemented method, comprising:
    building and storing an index of source code files in one or more memory devices, the index incorporating one or more tags and, for each tag, a name of a respective source code file in which the tag is defined, a path to the respective source code file relative to a root directory, and a representation of an include-tree of the respective source code file, where the include-tree is a sequence of files that are included by or imported by the respective source code file;
    receiving from a client device a search query and a current context, wherein the current context is a file being edited, the current context is in a directory in a path relative to the root directory, and the current context has an associated include-tree;
    searching the index and identifying a plurality of source code files that define tags that satisfy the search query, the plurality of source code files including a plurality of source code files that are in the include-tree of the current context and at least one file that is not in the include-tree of the current context;
    ranking each of the plurality of source code files by applying multiple levels of sorting, including a first level of sorting where all source code files that are in the include-tree of the current context are ranked higher than all source code files that are not in the include-tree of the current context, and a second level of sorting where all source code files in the include-tree of the current context are ranked by the relative directory distance from the current context to each source code file; and
    communicating the ranking of the plurality of source code files to the client device as a response to the search query.

2. The method of claim 1, wherein ranking the plurality of source code files further includes applying a third level of sorting where source code files with lower levels of inclusion are ranked higher than source code files with higher levels of inclusion, where a level of inclusion is how many times a source code file is included by other source code files in a recursive way.

3. The method of claim 1, wherein building the index of source code files further comprises:
    receiving one or more s-expression formatted TAGS files, each TAGS file corresponding to one or more source code files and containing, for each source code file, a name of the source code file, a path to the source code file, a language of the source code file, one or more tags defined within the source code file, a location of each tag defined within the source code file, and an item descriptor of each tag defined within the source code file;
    storing the one or more TAG files in a data store; and
    using the one or more TAGS files to build the index of source code files.

4. The method of claim 3, wherein the item descriptor is one of a unique identifier of the tag, a type of the tag, a scope of the tag, or references to the type of the tag.

5. The method of claim 1, further comprising:
    receiving the search query and the current context from a client, where the search query and current context are formatted according to an s-expression protocol and include a command and at least one attribute of the search query; and
    wherein communicating the ranking of the plurality of source code files further comprises:
        formatting the ranking of the plurality of source code files as an s-expression formatted list including one or more tags that satisfy the search query, the list also including for each tag, a snippet of a line within a source code file that defines the tag, a path to the source code file, a line number of a definition of the tag in the source code file, and an offset into the source code file corresponding to the tag definition; and
        sending the formatted ranking of files to the client.

6. A computer-implemented system, comprising:
    an indexing engine that creates an index of source code files, the index incorporating one or more tags and, for each tag, a name of a respective source code file in which the tag is defined, a path to the respective source code file relative to a root directory, and a representation of an include-tree of the respective source code file, where the include-tree is a sequence of files that are included by or imported by the respective source code file;

an interface to receive a search query and a current context, where the current context is a file being edited, the current context is in a directory in a path relative to the root directory, and the current context has an associated include-tree; and a ranking engine that ranks a plurality of source code files that each define a tag that satisfies the search query, where the plurality of source code files includes a plurality of source code files that are in the include-tree of the current context and at least one file that is not in the include-tree of the current context, where the ranking includes applying multiple levels of sorting, including a first level of sorting where all source code files that are in the include-tree of the current context are ranked higher than all source code files that are not in the include-tree of the current context, and a second level of sorting where all source code files in the include-tree of the current context are ranked by the relative directory distance from the current context to each source code file.

7. The system of claim 6, wherein ranking the plurality of source code files further includes applying a third level of sorting where source code files with lower levels of inclusion are ranked higher than source code files with higher levels of inclusion, where a level of inclusion is how many times a source code file is included by other source code files in a recursive way.

8. The system of claim 6, wherein the indexing engine creates the index of source code files by performing operations further comprising:

receiving one or more s-expression formatted TAGS file, each TAGS file corresponding to one or more source code files and containing, for each source code file, a name of the source code file, a path to the source code file, a language of the source code file, one or more tags defined in the source code file, a location of each tag defined within the source code file, and an item descriptor of each tag defined within the source code file;

storing the one or more TAGS files in a data store; and using the one or more TAGS files to create the index of source code files.

9. The system of claim 6, wherein:

the search query and current context received by the interface are formatted according to an s-expression protocol and include a command and at least one attribute of the search query; and the interface sends an indicator of the ranked source code files to the client, the indicator formatted as an s-expression list, where the s-expression list contains at least one of a corresponding tag that satisfies the search query, a snippet of a line within the definition file that includes the corresponding tag that satisfies the search query, a path to the definition file, a line number of the corresponding tag, and an offset into the definition file where the corresponding tag is located.

10. A computer program product, encoded on a machine-readable storage device or a machine-readable storage substrate, configured to cause a data processing apparatus to perform operations comprising:

building an index of source code files, the index incorporating one or more tags and, for each tag, a name of a respective source code file in which the tag is defined, a path to the respective source code file relative to a root directory, and a representation of an include-tree of the respective source code file, where the include-tree is a sequence of files that are included by or imported by the respective source code file;

receiving a search query and a current context, where the current context is a file being edited, the current context is in a directory in a path relative to the root directory, and the current context has an associated include-tree;

searching the index and identifying a plurality of source code files that define tags that satisfy the search query, the plurality of source code files including a plurality of source code files that are in the include-tree of the current context and at least one file that is not in the include-tree of the current context;

ranking each of the plurality of source code files that define tags that satisfy the search query by applying a multiple levels of sorting, including a first level of sorting where all source code files that are in the include-tree of the current context are ranked higher than all source code files that are not in the include-tree of the current context, and a second level of sorting where all source code files in the include-tree of the current context are ranked by the relative directory distance from the current context to each source code file; and communicating an indicator of the plurality of source code files that define tags that satisfy the search query as a response to the search query.

11. The product of claim 10, wherein ranking each of the plurality of source code files further includes:

applying a third level of sorting, where source code files with lower levels of inclusion are ranked higher than source code files with higher levels of inclusion, where a level of inclusion is how many times a source code file is included by other source code files in a recursive way.

12. The product of claim 10, wherein building an index of source code files further comprises:

receiving one or more s-expression formatted TAGS file, each TAGS file corresponding to one or more source code files and containing, for each source code file, a name of the source code file, a path to the source code file, a language of the source code file, one or more tags defined in the source code file, a location of each tag defined within the source code file, and an item descriptor of each tag defined within the source code file;

storing the one or more TAGS files; and using the one or more TAGS files to build the index of source code files.

13. The product of claim 12, wherein the item descriptor is one of a unique identifier of the tag, a type of the tag, a scope of the tag, or references to the type of the tag.

14. The product of claim 10, further comprised to cause a data processing apparatus to perform operations comprising:

receiving the search query and the current context form a client, where the search query and current context are formatted according to an s-expression protocol and include a command and at least one attribute of the search query; and wherein communicating the ranking of the files further comprises:

formatting the ranking of files as an s-expression formatted list including one or more tags that satisfy the search query, the list also including for each tag, a snippet of a line within a source code file that defines the tag, a path to the source code file, a line number of a definition of the tag in the source code file, and an offset into the source code file corresponding to the tag definition; and sending the formatted ranking of files to the client.

15. A system comprising: a computer having software stored on a memory of the computer, the software causing the computer to perform operations comprising:

processing a set of one or more source code files, where each source code file is stored in a directory under a root directory;

identifying one or more source code files from the set of one or more source code files, each identified source code file defining one or more tags;

creating an s-expression TAGS file containing, for each identified source code file, a name of the identified source code file, a path of the identified source code file relative to the root directory of the identified source code file, a programming language of the identified source code file, a location of a tag definition within the identified source code file, and an item descriptor of the tag defined within the identified source code file;

communicating to a server a search query and a current context, formatted according to an s-expression protocol, where the current context is a file being edited and the current context is in a directory corresponding to a path relative to the root directory; and receiving from a server, in response to the search query, information about one or more source code files that contain tags that satisfy the search query, the information formatted as an s-expression list, the s-expression list including one or more tags that satisfy the search query and including, for each tag, a snippet of a line within a source code file that includes a definition of the tag, a path to the source code file, a line number of the tag definition, and an offset into the source code file corresponding to the tag definition.

16. A computer program product, encoded on a machine-readable storage device or a machine-readable storage substrate, configured to cause a data processing apparatus to perform operations comprising:

processing a set of one or more source code files, where each source code file is stored in a directory under a root directory;

identifying one or more source code files from the set of one or more source code files, each identified source code file defining one or more tags;

creating an s-expression TAGS file containing, for each identified source code file, a name of the identified source code file, a path of the identified source code file relative to the root directory of the identified source code file, a programming language of the identified source code file, a location of a tag definition within the identified source code file, and an item descriptor of the tag defined within the identified source code file;

communicating a search query and a current context, formatted according to an s-expression protocol, where the current context is a file being edited and the current context is in a directory corresponding to a path relative to the root directory; and receiving, in response to the search query, information about one or more source code files that contain tags that satisfy the search query, the information formatted as an s-expression list, the s-expression list including one or more tags that satisfy the search query and including, for each tag, a snippet of a line within a source code file that includes a definition of the tag, a path to the source code file, a line number of the tag definition, and an offset into the source code file corresponding to the tag definition.

17. The method of claim 5, wherein the s-expression formatted list further includes a directory distance between the source code file and the current context.

18. The system of claim 9, wherein the s-expression formatted list further includes a directory distance between the source code file and the current context.

19. The product of claim 14, wherein the s-expression formatted list further includes a directory distance between the source code file and the current context.

20. The system of claim 15, wherein the s-expression list further includes a directory distance between the source code file and the current context.

21. The computer program product of claim 16, wherein the s-expression list further includes a directory distance between the source code file and the current context.

* * * * *

UNITED STATES PATENT AND TRADEMARK OFFICE
CERTIFICATE OF CORRECTION

PATENT NO.       : 7,613,693 B1                                                                 Page 1 of 1
APPLICATION NO.  : 11/565081
DATED            : November 3, 2009
INVENTOR(S)      : Piaw Na It is certified that error appears in the above-identified patent and that said Letters Patent is hereby corrected as shown below:

First page, Column 2, line 8, please delete "updates,blogspot." and insert --updates.blogspot.-- therefor;

First page, Column 2 (Abstract), line 1, please delete "TAG" and insert --TAGS-- therefor;

Column 8, line 38, in Claim 3, please delete "TAG" and insert --TAGS-- therefor;

Column 10, line 15, in Claim 10, please delete "applying a multiple" and insert --applying multiple-- therefor;

Column 10, line 50, in Claim 14, please delete "comprised" and insert --configured-- therefor;

Column 10, line 52, in Claim 14, please delete "form" and insert --from-- therefor.

Signed and Sealed this

Nineteenth Day of January, 2010

David J. Kappos
*Director of the United States Patent and Trademark Office*